(12) United States Patent
Levin et al.

(10) Patent No.: US 6,229,839 B1
(45) Date of Patent: May 8, 2001

(54) METHOD AND APPARATUS FOR TIME TRACKING (75) Inventors: Jeffrey A. Levin; Christopher C. Riddle; Tom Sherman, all of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/246,446

(22) Filed: Feb. 8, 1999

(51) Int. Cl.[7] ....................................... H04L 27/30
(52) U.S. Cl. .................... 375/142; 375/143; 375/145; 375/149; 375/150; 375/152; 370/320
(58) Field of Search ..................... 375/142, 143, 375/145, 149, 150, 152; 370/320, 335, 342, 252; 455/67.1, 506

(56) References Cited

U.S. PATENT DOCUMENTS

| | | | |
|---|---|---|---|
| 4,189,733 | * | 2/1980 | Malm .................................. 343/100 |
| 5,881,057 | * | 3/1999 | Komatsu .............................. 370/335 |
| 5,889,815 | * | 3/1999 | Iwakiri ................................ 375/205 |
| 5,953,364 | * | 9/1999 | Yamamoto ........................... 375/200 |
| 6,026,115 | * | 2/2000 | Higashi et al. ...................... 375/200 |
| 6,075,811 | * | 6/2000 | Naruse et al. ....................... 375/206 |
| 6,112,311 | * | 9/2000 | Watanabe et al. ................... 375/147 |

* cited by examiner

Primary Examiner—Stephen Chin
Assistant Examiner—Dac V. Ha
(74) Attorney, Agent, or Firm—Philip Wadsworth; Charles D. Brown; Tom Streeter (57) ABSTRACT In order to time track an incoming signal, a receiver demodulates a first instance of a signal to produce a first set of energy values corresponding to a set of possible data values of the signal. The receiver also demodulates a second instance of the signal to produce a second set of energy values corresponding to the set of possible data values. The receiver combines the first and the second sets of energy values to determine a combined set of energy values. The receiver determines a first estimate of a most likely transmitted data value based upon the combined set of energy values. The receiver decovers an early set of despread samples of the first instance using a symbol corresponding to the first estimate to produce a first early energy value. The receiver decovers a late set of despread samples of the first instance using the symbol corresponding to the first estimate to produce a first late energy value. Finally, the receiver determines a time offset of the first instance based upon the first early and the first late energy values.

15 Claims, 8 Drawing Sheets

PRIOR ART

METHOD AND APPARATUS FOR TIME TRACKING

BACKGROUND OF THE INVENTION

1. Field of the Invention

The invention relates to communication systems. More particularly, the invention relates to time tracking in a wireless communication system.

2. Description of the Related Art

Figure 1:
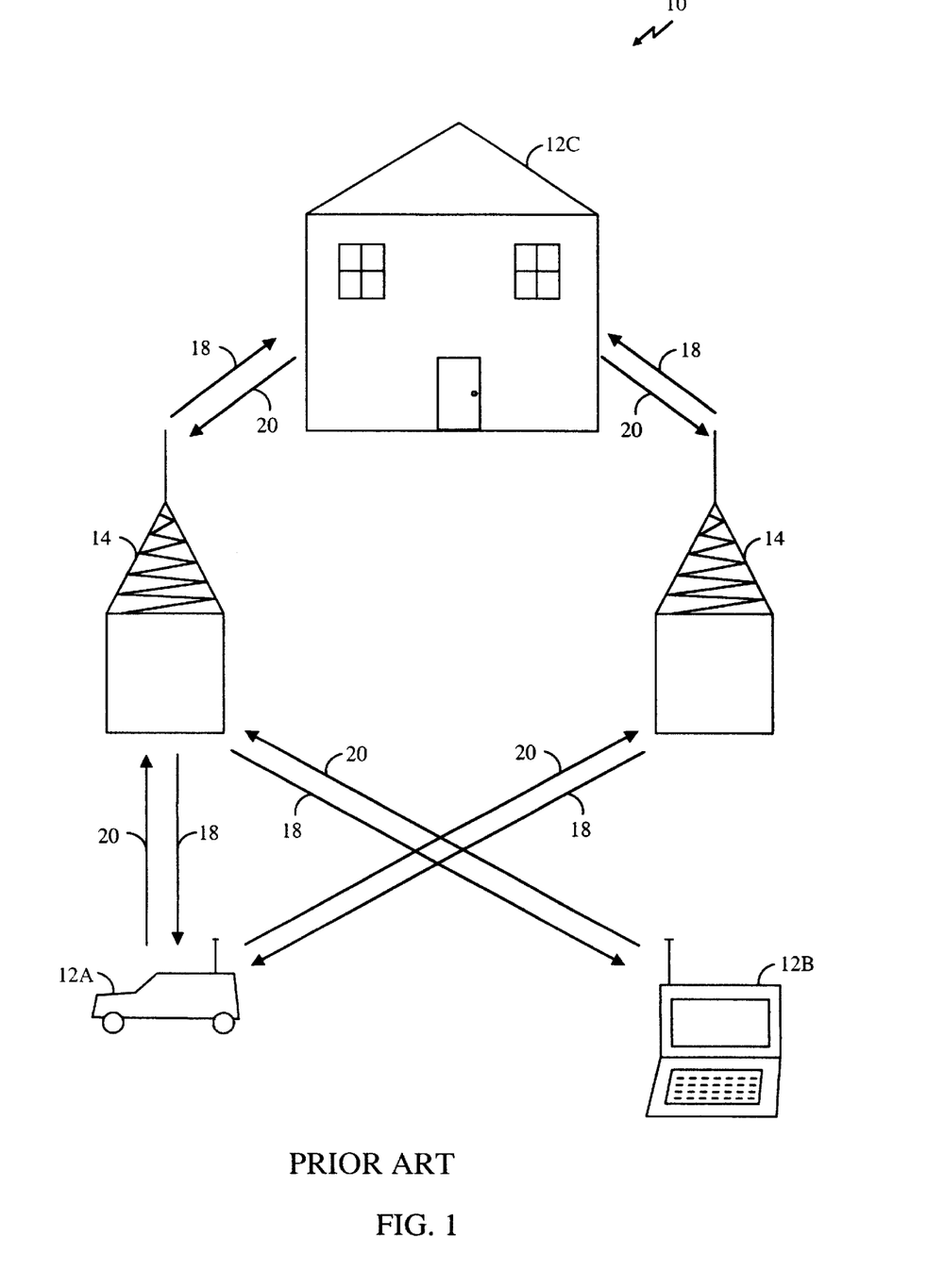
FIG. 1 is an exemplifying block diagram of a terrestrial wireless communication system.

FIG. 1 is an exemplifying embodiment of a terrestrial wireless communication system 10. FIG. 1 shows the three remote units 12A, 12B and 12C and two base stations 14. In reality, typical wireless communication systems may have many more remote units and base stations. In FIG. 1, the remote unit 12A is shown as a mobile telephone unit installed in a car. FIG. 1 also shows a portable computer remote unit 12B and the fixed location remote unit 12C such as might be found in a wireless local loop or meter reading system. In the most general embodiment, remote units may be any type of communication unit. For example, the remote units can be hand-held personal communication system units, portable data units such as a personal data assistant, or fixed location data units such as meter reading equipment. FIG. 1 shows a forward link signal 18 from the base stations 14 to the remote units 12 and a reverse link signal 20 from the remote units 12 to the base stations 14.

In a typical wireless communication system, such as that illustrated in FIG. 1, some base stations have multiple sectors. A multi-sectored base stations comprises multiple independent transmit and receive antennas as well as independent processing circuitry. The principles discussed herein apply equally to each sector of a multi-sectored base station and to a single-sectored independent base station. For the remainder of this description, therefore, the term "base station" can be assumed to refer to either a sector of a multi-sectored base station, a single-sectored base station or a multi-sectored base station.

In a code division multiple access (CDMA) system, remote units use a common frequency band for communication with all base stations in the system. Use of a common frequency band adds flexibility and provides many advantages to the system. For example, the use of a common frequency band and enables a remote unit to simultaneously receive communications from more than one base station as well as transmit a signal for reception by more than one base station. The remote unit can discriminate and separately receive the simultaneously received signals from the various base stations through the use of the spread spectrum CDMA waveform properties. Likewise, the base station can discriminate and separately receive signals from a plurality of remote units. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA communication techniques offer many advantages over narrow band modulation techniques. In particular, the terrestrial channel poses special problems by the generation of multipath signals which can be overcome through the use of CDMA techniques. For example, at the base station receiver, separate multipath instances from a common remote unit signal can be discriminated and separately received using similar CDMA techniques as those used to discriminate between signals from the various remote units.

In the terrestrial channel, multipath is created by reflection of signals from obstacles in the environment, such as trees, buildings, cars and people. In general, the terrestrial channel is a time varying multipath channel due to the relative motion of the structures that create the multipath. For example, if an ideal impulse is transmitted over a multipath channel, a stream of pulses is received. In a time varying multipath channel, the received stream of pulses changes in time location, amplitude and phase as a function of the time at which the ideal impulse is transmitted.

Figure 2:
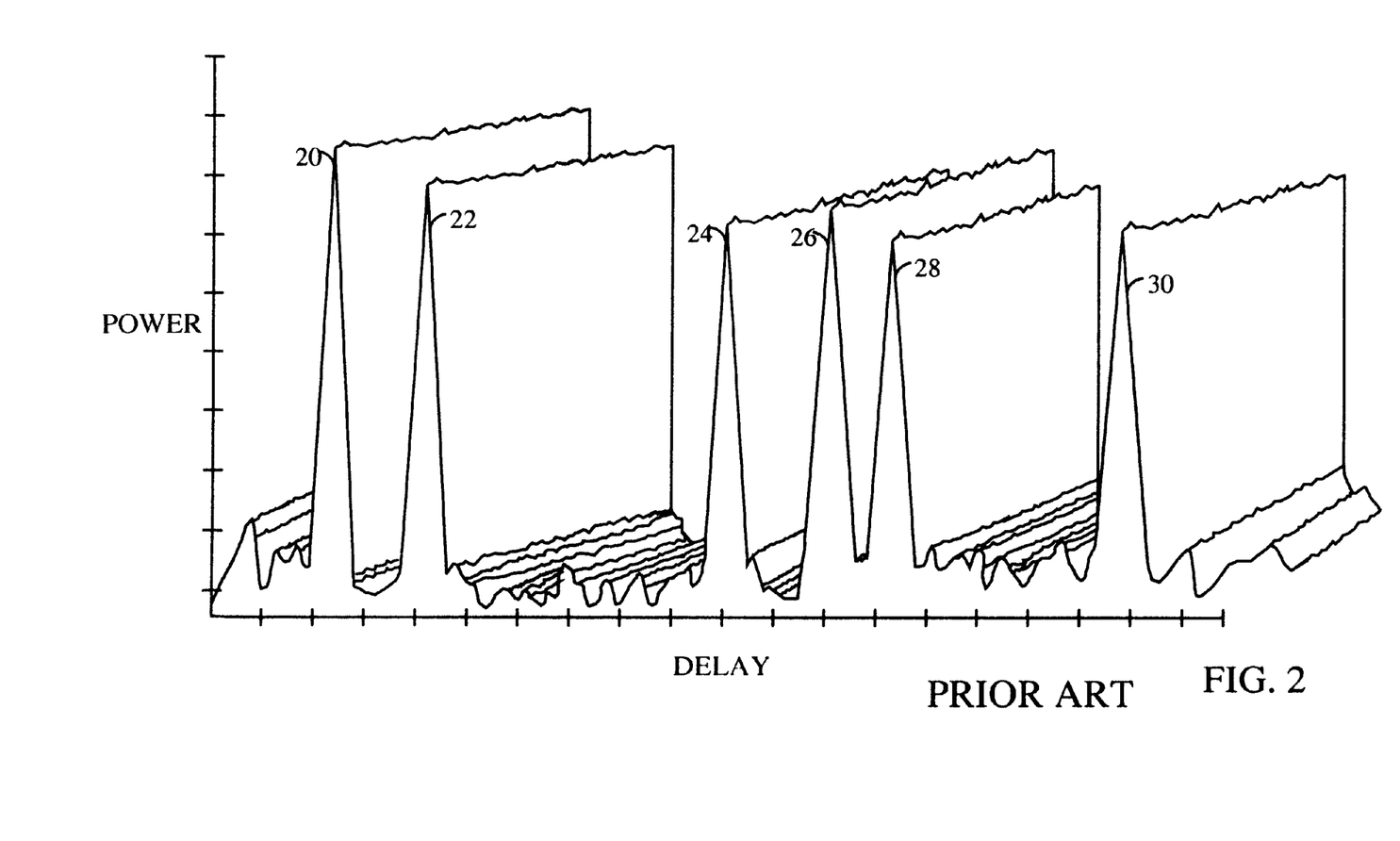
FIG. 2 is a graph showing an exemplifying set of signals from a single remote unit arriving at a base station.

FIG. 2 shows an exemplifying set of signal instances from a single remote unit arriving at the base station. The vertical axis represents the power received on a dB scale. The horizontal axis represents the delay in arrival of the instances at the base station due to transmission path delays. An axis (not shown) going into the page represents a segment of time. Each signal instance in the common plane of the page has arrived at a common time but was transmitted by the remote unit at a different time. In a common plane, peaks to the right represent signal instances which were transmitted at an earlier time by the remote unit than peaks to the left. For example, the left-most peak 20 corresponds to the most recently transmitted signal instance. Each signal peak 20–30 corresponds to a signal which has traveled a different path and, therefore, exhibits a different time delay and a different phase and amplitude response.

The six different signal spikes represented by peaks 20–30 are representative of a severe multipath environment. Typical urban environments produce fewer usable instances. The noise floor of the system is represented by the peaks and dips having lower energy levels.

Note that each of the multipath peaks varies in amplitude as a function of time as shown by the uneven ridge of each multipath peak 20–30. In the limited time shown, there are no major changes in the amplitude of the multipath peaks 20–30. However, over a more extended time range, multipath peaks diminish in amplitude and new paths are created as time progresses. The peaks can also slide to earlier or later time offsets as path distances change due to movement of objects in the coverage area of the base station.

In addition to the terrestrial environment, multiple signal instances can also result from the use of satellite systems. For example, in a GlobalStar system, remote units communicate through a series of satellites rather than terrestrial base stations. The satellites orbit the earth in approximately 2 hours. The movement of the satellite through its orbit causes the path distance between the remote unit and the satellite to change over time. In addition, as a satellite moves out of range of the remote unit, a soft hand-off from one satellite to another satellite is performed. During the soft hand-off, the remote unit demodulates signals from more than one satellite. These multiple signal instances can be combined in the same manner as the multipath signal instances in a terrestrial system. One difference, however, is that the signal instances tend to be offset from one another by approximately 0–500 microseconds in the terrestrial environment while the signal instances received through two satellites tend to be offset from one another on the order of 0–20 milliseconds.

In both terrestrial and satellite systems, usable signal instance can result from other sources. For example, in order to overcome the effects of fading, often two or more diversity receivers are used. In addition, multiple signal instances are created during softer hand-off between sectors of a common base station.

Figure 3:
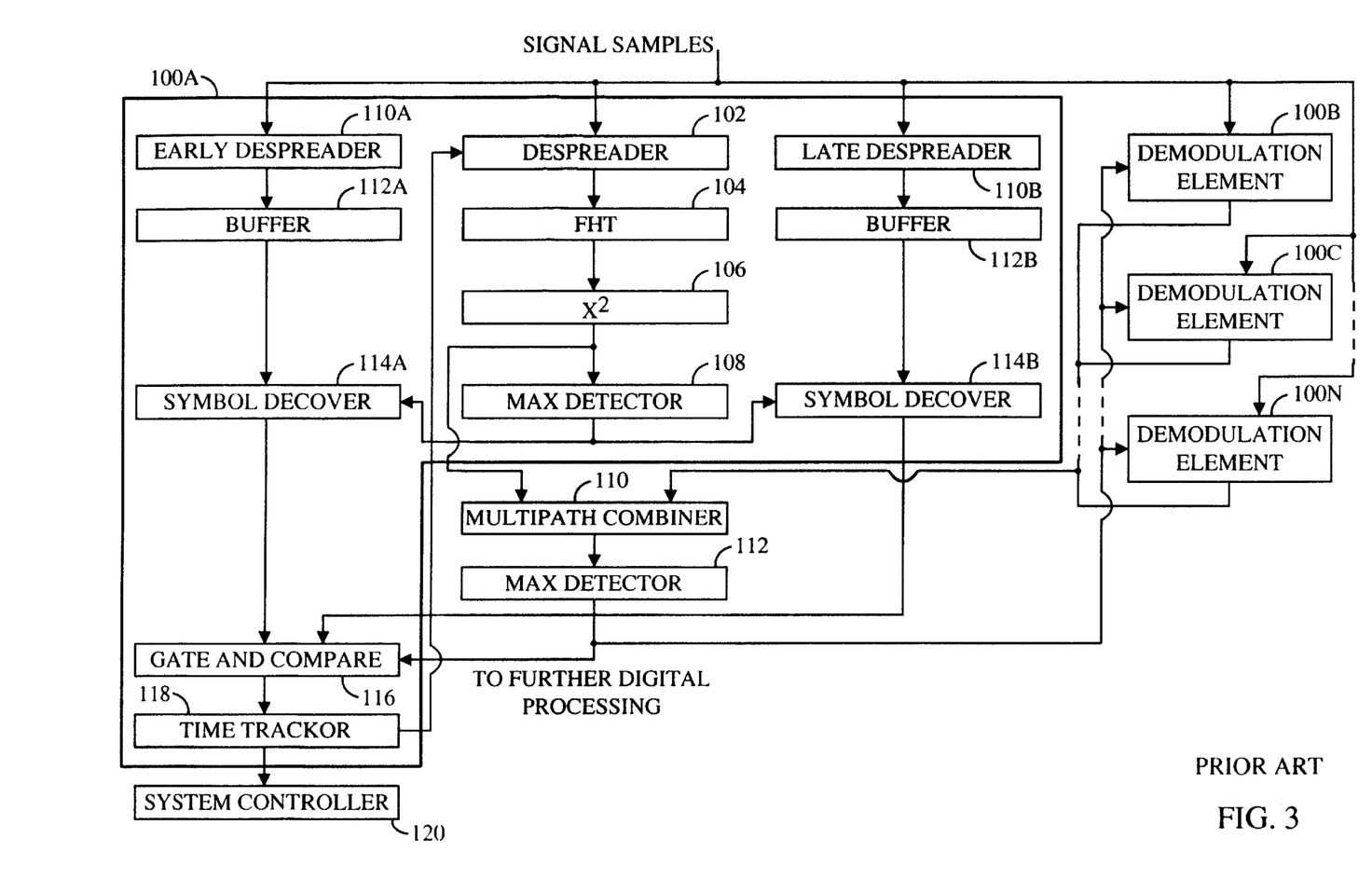
FIG. 3 is a block diagram of a prior art rake receiver.

FIG. 3 is a block diagram of a prior art rake receiver. The rake receiver shown in FIG. 3 comprises N demodulation elements 100A–100N. The demodulation element 100A has been detailed in FIG. 3 and the demodulation elements 100B–100N can be assumed to be configured in a similar manner to the demodulation element 100A. Incoming signal samples are coupled to the input of each of the demodulation elements 100A–100N. Within the demodulation element 100A, a despreader 102 correlates the incoming signal samples with the spreading code used to spread the signal at the corresponding remote unit. The output of the despreader 102 is coupled to a Fast Hadamard Transformer (FHT) 104. The FHT 104 is configured to correlate the despread samples with each one of a set of possible symbol values. For example, in one embodiment, the system operates in accordance with the Telephone Industry Association, Electronic Industry Association (TIA/EIA) interim standard entitled "Mobile Station—Base Station Compatibility Standard For Dual-Mode Wideband Spread Spectrum Cellular System," TIA/EIA/IS-95, generally referred to as IS-95, the contents of which are incorporated by reference herein in their entirety. In such a system, a group of 6 data bits are mapped into 1 of 64 orthogonal Walsh symbols. The FHT 104 correlates the despread samples with the 64 orthogonal Walsh symbols. The FHT 104 produces a set of different voltage levels, one voltage level corresponding to each of the possible symbol values.

The output of the FHT 104 is coupled to an energy determination block 106 which determines a corresponding energy value for the each of the possible symbol values. The output of the energy determination block 106 is coupled to a multipath combiner 110. In addition, the energy output values of the demodulation elements 100B–100N are also coupled to the input of the multipath combiner 110. The multipath combiner 110 combines the energy values output by each of the demodulation elements 100A–100N on a symbol by symbol basis to determine a combined set of energy values, one energy value corresponding to each of the possible symbol values.

The output of the multipath combiner 110 is coupled to a maximum detector 112. The maximum detector 112 determines the most likely transmitted data value based upon the combined set of energy values. For example, in one embodiment, the maximum detector 112 operates in accordance with U.S. Pat. No. 5,442,627 entitled "Non-Coherent Receiver Employing a Dual-Maxima Metric Generation Process" assigned to the assignee hereof and incorporated herein in its entirety by this reference. The output of the maximum detector 112 is coupled to digital processing circuitry which executes further digital processing.

As noted above, each demodulation element 100A–100N tracks in time the signal instance to which it is assigned. In order to do this, the demodulation element 100A demodulates the incoming signal samples at an earlier and a later time offset than the nominal on-time offset. By comparing the energy results of the early and late process, the accuracy of the current on-time estimate can be determined according to well-known principles of communication. As shown in FIG. 3, an early despreader 110A despreads the incoming signal samples with a time offset advanced by approximately one half chip from the time offset used by the despreader 102. Likewise, a late despreader 110B despreads the incoming signal samples with a time offset retarded by approximately one half chip from the time offset used by the despreader 102. The voltage levels output by the early despreader 110A and the late despreader 110B are stored temporarily in a buffer 112A and a buffer 112B, respectively.

As shown in FIG. 3, the output of the energy determination block 106 is also coupled to a maximum detector 108 which determines the most likely transmitted data value based upon the output of the energy determination block 106. A symbol decovering block 114A correlates the despread samples stored in the buffer 112A with the symbol corresponding to the most likely transmitted data value. For example, in one embodiment, a Walsh symbol corresponding to the most likely transmitted data value is correlated with the stored samples in a similar manner in which the incoming signal samples are correlated with the spreading code within the early despreader 110A. In a similar manner, a symbol decovering block 114B correlates the despread samples stored in the buffer 112B with the symbol corresponding to the most likely transmitted data value. The symbol decovering blocks 114A and 114B produce an early energy value and a late energy value, respectively.

The early and late energy values are stored in a gate and compare block 116. If the most likely transmitted data value chosen by the maximum detector 112 is the same as the data value generated by the maximum detector 108, the block 116 compares the early and late energy levels. According to well-known principles of communication theory, if the two values are equal, the proper time offset is being used by the despreader 102. However, if one value is larger than the other, the time offset used by the despreader 102 is offset from the ideal time offset. A time trackor 118 accumulates the energy value output by the gate and compare block 116 to determine an updated time offset value for use by the despreader 102. In addition, the time offset output of the time trackor 118 is typically forwarded to a system controller 120 which performs a demodulation element assignment algorithm.

If the data value generated by the maximum detector 112 is different than the data value generated by the maximum detector 108, it is assumed that the maximum detector 108 has made an error. This assumption is based upon the well-known principle of communication theory that by combining the energy levels produced by several demodulation elements, a more accurate determination of the most likely transmitted data value is made. For this reason, on average, the maximum detector 112 produces a more accurate estimate of the transmitted data than the maximum detector 108. Therefore, if the data value generated by the maximum detector 108 is not the same as the value generated by the maximum detector 112, the corresponding early and late energy values are likely to have been determined using an erroneous data value and, thus, do not present viable data. For this reason, the gate and compare block 116 discards these values and does not forward them to the time trackor 118.

Additional information concerning rake receivers, demodulators and time tracking can be found in U.S. Pat. No. 5,654,979 entitled "Cell Site Demodulation Architecture for a Spread Spectrum Multiple Access Communication", U.S. Pat. No. 5,644,591 "Method and Apparatus for Performing Search Acquisition in a CDMA Communications system", U.S. Pat. No. 5,561,618 entitled "Method and Apparatus for Performing a Fast Hadamard Transform", U.S. Pat. No. 5,490,165 entitled "Demodulation Element Assignment in a System Capable of Receiving Multiple Signals", U.S. Pat. No. 5,805,648 entitled "Method and Apparatus for Performing Search Acquisition in a CDMA Communication System", each of which is assigned to the assignee hereof and incorporated in its entirety herein by this reference.

One deficiency of such operation is that a substantial amount of invalid time tracking data is developed and then discarded by the gating process. For example, even if the error rate of the demodulation elements is individually as high as eighty percent, the error rate of the combined signal can be as low as ten percent and, thus, present a viable communications channel. Thus, if the error rate of the demodulation element is about eighty percent, about 4 out of 5 energy values calculated by the symbol decovery blocks 114A and 114B are invalid and, thus, discarded by the gating process and not used by the time trackor 118. In such a situation, the time trackor operates based upon only about twenty percent of the available energy. Such operation unnecessarily delays the time tracking process and also decreases the precision of the time tracking process.

Figure 4A:
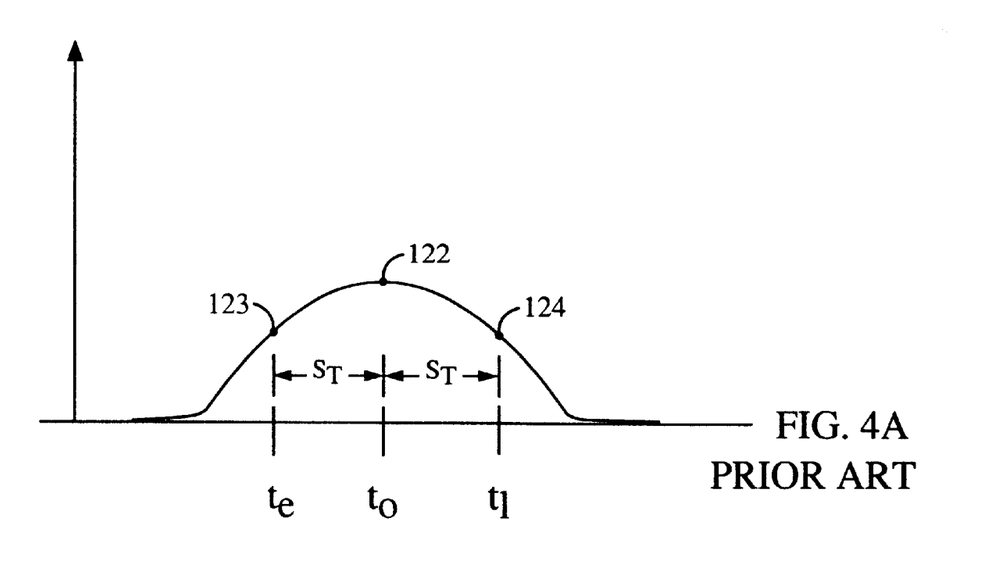
FIG. 4A is a graph showing the energy received as a function of the time offset used to demodulate a signal.

When the time offset used by the despreader 102 is offset from the ideal offset, the energy output by the energy determination block 106 is reduced. FIG. 4A is a graph showing the energy received as a function of the time offset used to demodulate a signal. In FIG. 4A, the vertical axis represents the energy detected by the rake receiver and the horizontal axis represents the time offset used by the rake receiver to demodulate the signal. When the rake receiver demodulates the signal with ideal synchronization at an ideal on-time alignment $t_0$, the rake receiver detects the maximum energy available from the signal as shown by data point 122 on FIG. 4A. If the rake receiver demodulates the remote unit signal using a timing which is delayed by a time offset 6, from the ideal on-time alignment to to a late time alignment, $t_1$, the rake receiver detects less energy as shown by data point 124 on FIG. 4A. In a like manner, if the rake receiver demodulates the remote unit signal using a timing which is advanced by the time offset $\delta_t$ from the ideal on-time alignment $t_0$ to an early time alignment $t_e$, the rake receiver detects less energy as shown by data point 123 in FIG. 4A. So long as the early and late alignments are offset from the on-time alignment by the same amount of time and the on-time alignment is ideal, the energy detected at the early and late alignments is the same.

Figure 4B:
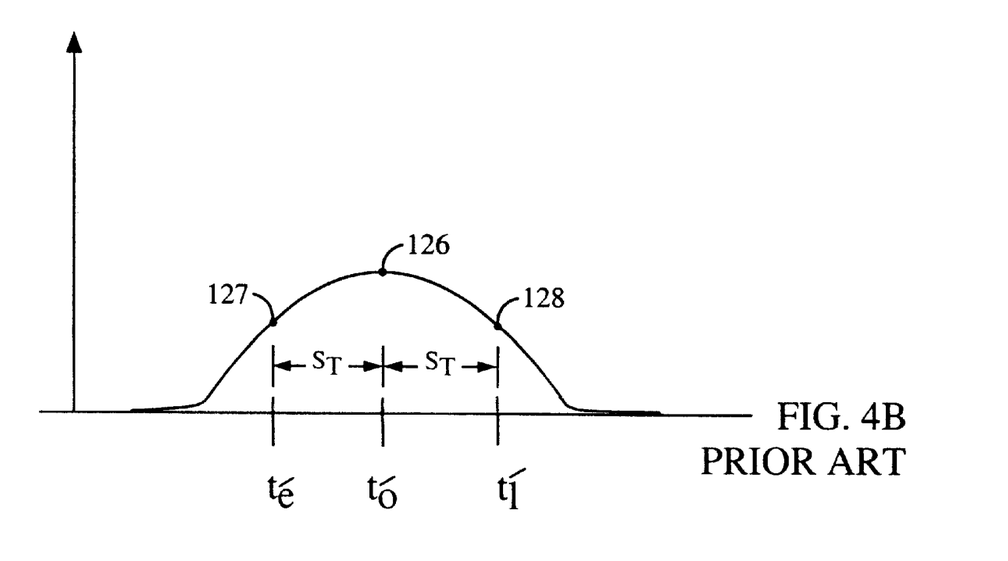
FIG. 4B is a graph showing the energy received as a function of the time offset used to demodulate a signal when the on-time alignment is delay compared to the ideal timing.

FIG. 4B is a similar diagram to FIG. 4A except that an on-time alignment $t_0$' has been skewed to be slightly late of the ideal timing. Notice that due to the offset, the amount of energy detected at data point 126 is less than that detected in the ideal case at data point 122. If the rake receiver demodulates the signal at time offset $\delta_t$ earlier than the on-time alignment $t_0$' at the early time alignment $t_c$' in FIG. 4B as shown by data point 127, the rake receiver detects more energy than at data points 62 and 64 of FIG. 4A. Likewise, if the rake receiver demodulates the remote unit signal at an offset delayed by time offset $\delta_t$ from the on-time alignment $t_0$' at the late time alignment $t_1$' as shown by data point 128, the rake receiver detects less energy than at data points 62 and 64 in FIG. 4A and also data point 127 in FIG. 4B. By comparing the energy detected by the rake receiver at an early time alignment and a late time alignment, it is possible to determine whether the on-time alignment is ideally aligned. If the early and late time alignments yield the same energy level, the rake receiver is likely to be detecting the signal with an accurate time alignment. If an energy level detected at the early alignment is significantly higher than the energy level detected at the late alignment, the rake receiver is likely to be detecting the signal with an alignment delayed from the ideal. If an energy level detected at the late alignment is significantly higher than the energy level detected at the early alignment, the rake receiver is likely to be detecting the signal with an alignment advanced from the ideal.

The reduction in energy produces a corresponding reduction in the total energy produced by the multipath combiner 110. According, the lower total energy produces a corresponding decrease the accuracy of the data value determination process executed by the maximum detector block 112, thus reducing the overall performance of the receiver. In addition, the reduction in energy produces less accurate time tracking for weak signal instances than for strong signal instances, thus further reducing the usable energy produced by weak signal instances.

Therefore, there has been a long-felt need in the art for a more accurate system and method of time tracking.

SUMMARY OF THE INVENTION

In order to time track an incoming signal, a receiver demodulates a first instance of a signal to produce a first set of energy values corresponding to a set of possible data values of the signal. The receiver also demodulates a second instance of the signal to produce a second set of energy values corresponding to the set of possible data values. The receiver combines the first and the second sets of energy values to determine a combined set of energy values. The receiver determines a first estimate of a most likely transmitted data value based upon the combined set of energy values. The receiver decovers an early set of despread samples of the first instance using a symbol corresponding to the first estimate to produce a first early energy value. The receiver decovers a late set of despread samples of the first instance using the symbol corresponding to the first estimate to produce a first late energy value. Finally, the receiver determines a time offset of the first instance based upon the first early and the first late energy values.

The operation according to the invention increases the energy input into the time tracking process. The increased energy increases the accuracy and speed of the time tracking process. By increasing the performance the time tracking process, signal instances which were previously too weak to be properly time tracked can be now be time tracked accurately. In this way, additional energy is available to the system in terms of additional viable signal instances which previously could not have been accurately demodulated. The additional energy in turn improves the overall performance of the receiver.

BRIEF DESCRIPTION OF THE DRAWINGS

The features, objectives, and advantages of the invention will become more apparent from the detailed description set forth below when taken in conjunction with the drawings.

DETAILED DESCRIPTION OF THE INVENTION

The invention improves the ability of a receiver to estimate the time offset of a received signal instance. According to the invention, energy values from more than one demodulation process are combined together to determine an estimate of the most likely transmitted data value. In turn, the symbol value corresponding to the estimate of the most likely transmitted data value is used to determine an early and a late signal energy level for use in the time tracking process for each individual demodulation process—whether or not the data value would have been selected based solely on the energy values corresponding to the individual demodulation process. In this way, early and late energy levels corresponding to each received symbol are used in the time tracking process and no gating mechanism is necessary. By using the early and late energy values corresponding to each symbol, the total energy input into the time tracking process is increased. By increasing the energy input into the time tracking process, the accuracy and speed of the time tracking process is increased. More accurate time tracking results in more energy produced by each demodulation process which in turn improves the overall performance of the receiver.

Figure 5:
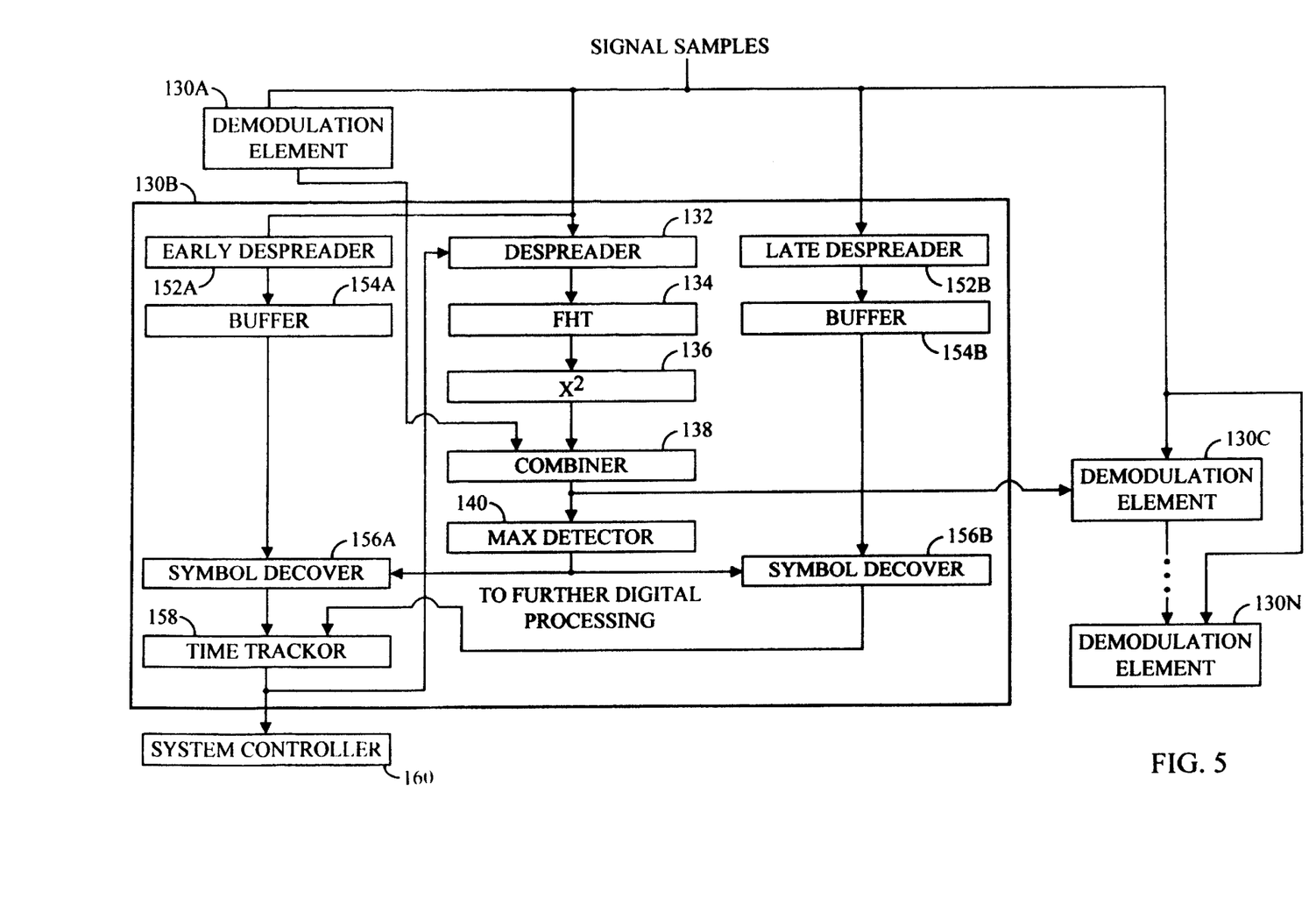
FIG. 5 is a block diagram showing an embodiment of the invention configured for use in a system in which the signal instances are received significantly offset in time from one another.

FIG. 5 is a block diagram showing an embodiment of the invention especially configured for use in a system in which the multiple instances of the signal are received significantly offset in time from one another although it can be used in other types of systems. For example, the receiver shown in FIG. 5 can be used in a satellite communication system in which the remote unit is capable of receiving signals from two or more satellites simultaneously. In FIG. 5, the receiver includes at least four demodulation elements 130A–130N. However, the general principles illustrated by FIG. 5 can be applied to receivers which provide for demodulation of two or more signal instances.

The demodulation element 130B is detailed in FIG. 5 and the demodulation elements 130A, 130C and 130N can be assumed to be configured in a similar manner. Each of the demodulation elements 130A–130N is configured to demodulate an instance of a signal from a common remote unit. For ease of discussion, it may be assumed that the demodulation elements 130A–130N are assigned to the incoming signal instances in a temporal order such that the demodulation element 130A demodulates the earliest arriving instance of the signal and the demodulation element 130N demodulates the latest arriving instance of the signal.

The demodulation elements 130A–130N are configured to receive a set of incoming signal samples. In one embodiment, the demodulation element 130A operates in a similar manner to demodulation element 100A of FIG. 3 in that a first estimate of the most likely transmitted data value is determined based upon the output of an energy determination block. However, rather than comprise a gating mechanism that awaits the arrival of subsequent instances of the signal and delays the time tracking process, each of the early and late energy values is used in the time tracking process and no gating mechanism is included. The operation of the demodulation element 130A will be more apparent with reference to the operation of the demodulation element 130B detailed directly below.

Within the demodulation element 130B, a despreader 132 correlates the incoming samples with the spreading code used to spread the signal at the corresponding remote unit. The despreader 132 despreads the signal samples using a time offset corresponding to the arrival time of the assigned signal instance which, in this case, is the second earliest arriving signal.

The output of the despreader 132 is coupled to a Fast Hadamard Transformer (FHT) 134. The FHT 134 is configured to correlate the despread samples with each one of a set of possible symbols. In one embodiment, the FHT 134 correlates the despread samples with 64 orthogonal Walsh symbols. The FHT 134 produces a voltage level corresponding to each one of the possible symbol values.

The output of the FHT 134 is coupled to an energy determination block 136 which determines the corresponding energy value for each of the possible symbol values. The output of the energy determination block 136 is coupled to a combiner 138. In addition, the energy values produced by the demodulation element 130A are also coupled to the combiner 138. The combiner 138 combines the energy values produced by the demodulation elements 130A and 130B on a symbol-by-symbol basis to determine a first combined set of energy values, one energy value corresponding to each of the possible symbol values. The combiner 138 time aligns the energy values produced by the demodulation element 130A and the energy values produced by the demodulation element 130B and, thus, can comprise memory for storing the energy values produced by the demodulation element 130A until the corresponding energy values are produced by the demodulation element 130B. After the stored data has been combined with the energy values produced by the demodulation element 130B, the stored data received from the demodulation element 130A can be erased, overwritten or otherwise corrupted.

The output of the combiner 138 is coupled to a maximum detector 140. The maximum detector 140 is configured to determine a second estimate of the most likely transmitted data value based upon the first combined set of energy values. For example, in one embodiment, the maximum detector 140 operates in accordance with above referenced U.S. Pat. No. 5,442,627. Because it is based upon the combined energy values, the second estimate of the most likely transmitted data value is a more accurate estimate than the first estimate generated within the demodulation element 130A and a more accurate estimate than could have been generated based on the output of the energy determination block 136 alone. In fact, the second estimate is the most accurate estimate available at the receiver until the demodulation element 130C generates the energy values for the next arriving instance of the signal.

Each demodulation element 130A–130N tracks in time the signal instance to which it is assigned. In order to do this, the demodulation element 130B demodulates the incoming signal samples at an earlier and a later time offset than the nominal on-time offset and compares the results to determine a new on-time estimate according to well-known principles of communication. As shown in FIG. 5, an early despreader 152A despreads the signal samples with a time offset advanced by approximately one-half chip from the time offset used by the despreader 132. Likewise, a late despreader 152B despreads the incoming signal samples with a time offset retarded by approximately one-half chip from the time offset used by the despreader 132. The despread signal samples output by the early despreader 152A and the late despreader 152B are stored temporarily in a buffer 154A and a buffer 154B, respectively.

The output of the maximum detector 140 is coupled to a symbol decovering block 156A. The symbol decovering block 156A correlates the stored despread samples from the buffer 154A with the symbol corresponding to the second estimate of the most likely transmitted data value. For example, in one embodiment, a Walsh symbol corresponding to the second estimate of the most likely transmitted data value is correlated with the stored samples in a similar manner in which the incoming signal samples are correlated with the spreading code within the early despreader 152A. In a similar manner, a symbol decovering block 156B correlates the despread samples stored in the buffer 154B with the second estimate of the symbol corresponding to the most likely transmitted data value. The symbol decovering blocks 156A and 156B produce an early energy value and a late energy value, respectively. After the stored data has been decovered, it can be erased, overwritten or otherwise corrupted.

The early and late energy values are coupled to a time trackor 158. The time trackor 158 compares the early and late energy values in order to estimate the arrival time of the signal instance. The arrival time estimate can be used to determine an updated time offset for use by the despreader 132, according to well-known principles of communication theory. Once again, no time gating processes is used and all generated data is input into the time tracking process. Because the second estimate is a more accurate estimate of the most likely transmitted data value, the early and late energy values are a more accurate indication of the actual energy values and a gating process need not be used. Because gating is not used, the time trackor 158 is provided with more data. Through the use of more data, the time trackor 158 produces more accurate time tracking. In addition, the time trackor 158 introduces less delay and can react more quickly to time changes in the signal instance, further increasing the accuracy of the time tracking process.

In one embodiment, the output of the time trackor 158 is coupled to a system controller 160 which performs a demodulation element assignment algorithm. In one embodiment, the system controller 160 is a general purpose microprocessor. In order to unclutter the figure, some of the connections between the demodulation elements 130A–130N and the system controller 160 are not shown.

The output of the combiner 138 is also coupled to a subsequent daisy-chained demodulation element 130C. In a similar manner, additional demodulation elements can be daisy-chained together. In each successive demodulation element, a combiner is daisy-chained to receive all available signal energy values such that, when all of the available demodulation elements are assigned to signal instances, the input to the maximum detector 126N is coupled to the final combined energy values and produces the estimate used for further digital processing. In this way, the accuracy of the time tracking process for the successive demodulation elements is increased based upon the more accurate estimation of the most likely transmitted data value determined by the combined energy levels. In such a system, not all of the demodulation elements are assigned to a signal instance at all times. For example, if only two signal instances are currently available, only two sets of energy values are combined. The output of the maximum detector corresponding to the demodulation element assigned to the latest arriving instance of the signal generates the most accurate estimate of the most likely transmitted data value. It is this value which is used in further signal processing within the receiver.

In the embodiment shown in FIG. 5, the demodulation element 130A generates an estimate of the most likely transmitted data value based only upon the signal energies available in the first instance of the signal. Therefore, in one embodiment, the demodulation element 130A need not comprise a combiner but otherwise is very similar to the demodulation element 130B. However, in practical embodiments, each demodulation element is simply a set of resources which can be assigned to any signal instance, whether or not the signal instance is the earliest arriving signal. Therefore, it can be more practical to configure each of the demodulation elements to have a combiner.

The process accomplished in FIG. 4 is described in a general sense with reference to the flow chart in FIG. 5. In block 200, a first instance of a signal is demodulated to produce a first set of energy values. These energy values are used to determine a first estimate of a most likely transmitted data value in block 202. The first estimate is used to decover the early and late offset samples corresponding to the first instance in block 204. And, in block 206, time tracking for the first instance is executed based upon these results.

In block 208, a second instance of the same signal is demodulated to produce a second set of energy values. In block 210, the second set of energy values is combined with the first set of energy values. In block 212, the combined energy is used to determine a second estimate of the most likely transmitted data value. In block 214, the second estimate is used to decover the early and late offset samples corresponding to the second instance. And, in block 216, time tracking for the second instance is executed based upon these results.

As noted above, and as shown in FIG. 5, this process may be continued for other instances of the signal. In block 218, a third instance of the same signal is demodulated to produce a third set of energy values. In block 220, the third set of energy values is combined with the first and second sets of energy values. In block 222, the combined energy is used to determine a third estimate of the most likely transmitted data value. In block 224, the third estimate is used to decover the early and late offset samples corresponding to the third instance. And, in block 226, time tracking for the third instance is executed based upon these results.

Figure 7:
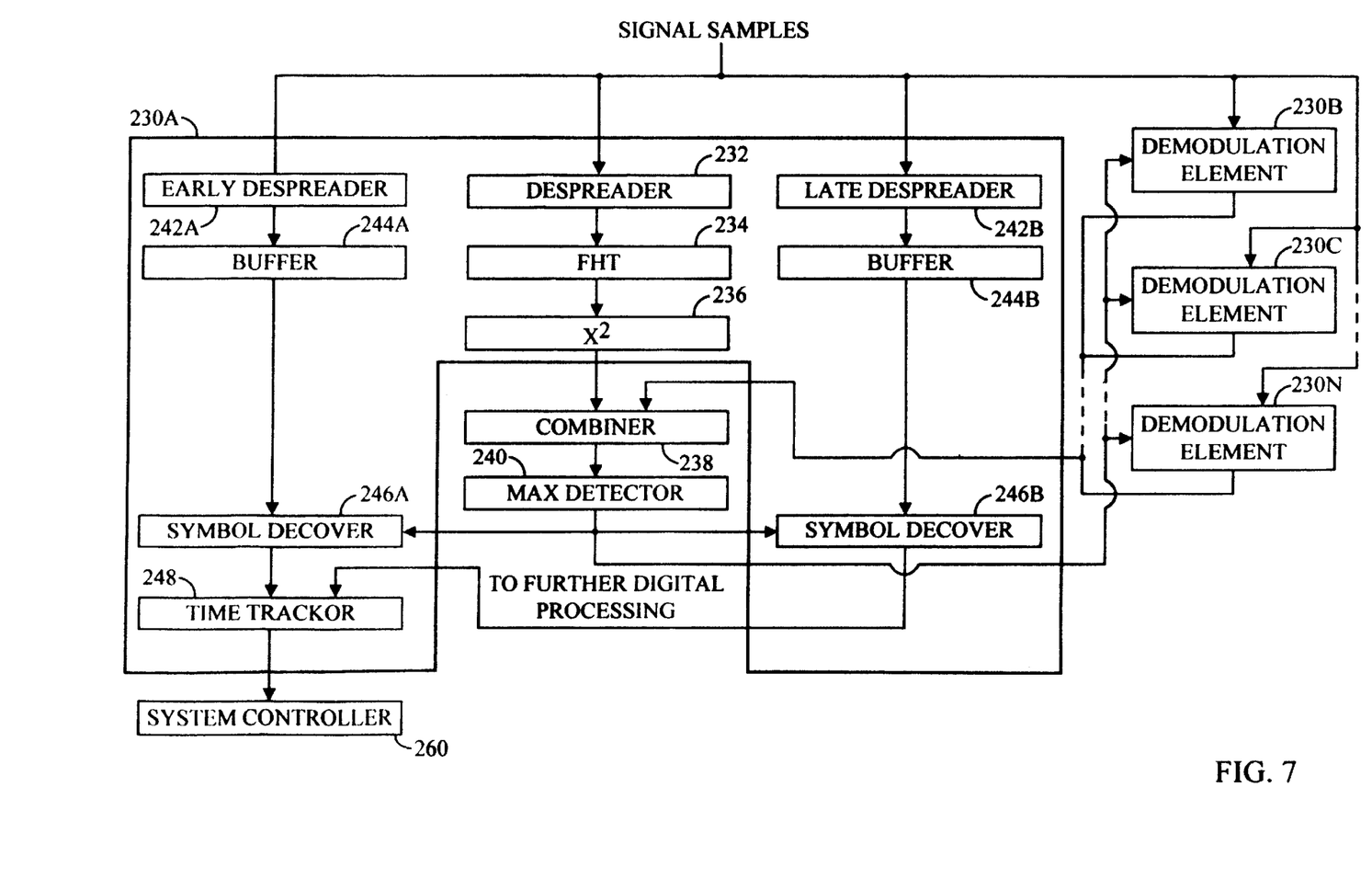
FIG. 7 is a block diagram of a receiver configured to operate in a system in which multiple instances of a common signal are received in relatively close temporal proximity to one another.

FIG. 7 is a block diagram of a receiver especially configured to operate in a system in which multiple instances of a common signal are received in relatively close temporal proximity to one another although it can be used in other types of systems. The rake receiver shown in FIG. 7 comprises N demodulation elements 230A–230N. The demodulation element 230A is detailed in FIG. 7 and the demodulation elements 230B–230N can be assumed to be configured in a similar manner. Each of the demodulation elements 230A–230N is configured to demodulate an instance of a signal from a common remote unit.

The demodulation elements 230A–230N are configured to receive a set of incoming signal samples. Within the demodulation element 230A, a despreader 232 correlates the incoming samples with the spreading code used to spread the signal at the corresponding remote unit. The despreader 232 despreads the signal samples using a time offset corresponding the arrival time of the assigned signal instance.

The output of the despreader 232 is coupled to a FHT 234. The FHT 234 is configured to correlate the despread samples with each one of a set of possible symbols. In one embodiment, the FHT 234 correlates the despread samples with 64 orthogonal Walsh symbols. The FHT 234 produces a voltage level corresponding to each one of the possible symbol values.

The output of the FHT 234 is coupled to an energy determination block 236 which determines the corresponding energy value for each of the possible symbol values. The output of the energy determination block 236 is coupled to a combiner 238. In addition, the energy values produced by the demodulation elements 230B–230N are also coupled to the combiner 238. The combiner 238 combines the energy values produced by the demodulation elements 230A–230N on a symbol-by-symbol basis to determine a combined set of energy values, one energy value corresponding to each of the possible symbol values. The combiner 238 time aligns the energy values produced by the demodulation elements 230A–230N and, thus, can comprise memory for storing the energy values until all the corresponding energy values are produced. After the stored data has been combined, the stored data can be erased, overwritten or otherwise corrupted.

The output of the combiner 238 is coupled to a maximum detector 240. The maximum detector 240 is configured to determine an estimate of the most likely transmitted data value based upon the combined set of energy values. Because it is based upon the combined energy values, the estimate of the most likely transmitted data value is the most accurate estimate available at the receiver and it is a more accurate estimate than could have been generated based on the output of any one of the demodulation elements 230A–230N alone.

Each demodulation element 230A–230N tracks in time the signal instance to which it is assigned. In order to do this, the demodulation element 230A demodulates the incoming signal samples at an earlier and a later time offset than the nominal on-time offset and compares the results to determine a new on-time estimate according to well-known principles of communication. As shown in FIG. 7, an early despreader 242A despreads the signal samples with a time offset advanced by approximately one-half chip from the time offset used by the despreader 232. Likewise, a late despreader 242B despreads the incoming signal samples with a time offset retarded by approximately one-half chip from the time offset used by the despreader 232. The despread samples output by the early despreader 242A and the late despreader 242B are stored temporarily in a buffer 244A and a buffer 244B, respectively.

The output of the maximum detector 240 is coupled to a symbol decovering block 246A. The symbol decovering block 246A correlates the stored despread samples from the buffer 244A with the symbol corresponding to the estimate of the most likely transmitted data value. For example, in one embodiment, a Walsh symbol corresponding to the estimate of the most likely transmitted data value is correlated with the stored samples in a similar manner to that in which the incoming signal samples are correlated with the spreading code within the early despreader 242A. In a similar manner, a symbol decovering block 246B correlates the despread samples stored in the buffer 154B with the estimate of the symbol corresponding to the most likely transmitted data value. The symbol decovering blocks 246A and 246B produce an early energy value and a late energy value, respectively.

The early and late energy values are coupled to a time trackor 248. The time trackor 248 compares the early and late energy values in order to estimate the arrival time of the signal instance. The arrival time estimate can be used to determine an updated time offset for use by the despreader 232, according to well-known principles of communication theory. Once again, no gating processes are used and all generated data is input into the time tracking process. Because the estimate is a more accurate estimate of the most likely transmitted data value, the early and late energy values are a more accurate indication of the actual energy values and a gating process need not be used. Because gating is not used, the time trackor 248 is provided with more data. Through the use of more data, the time trackor 248 produces more accurate time tracking.

In one embodiment, the output of the time trackor 248 is coupled to a system controller 260 which performs a demodulation element assignment algorithm. In one embodiment, the system controller 260 is a general purpose microprocessor. In order to unclutter the figure, some of the connections between the demodulation elements 230A–230N and the system controller 260 are not shown.

In such a system, not all of the demodulation elements are assigned to a signal instances at all times. For example, if only two signal instances are currently available, only two sets of energy values are combined. The output of the maximum detector 240 is used in further signal processing within the receiver.

Figure 6:
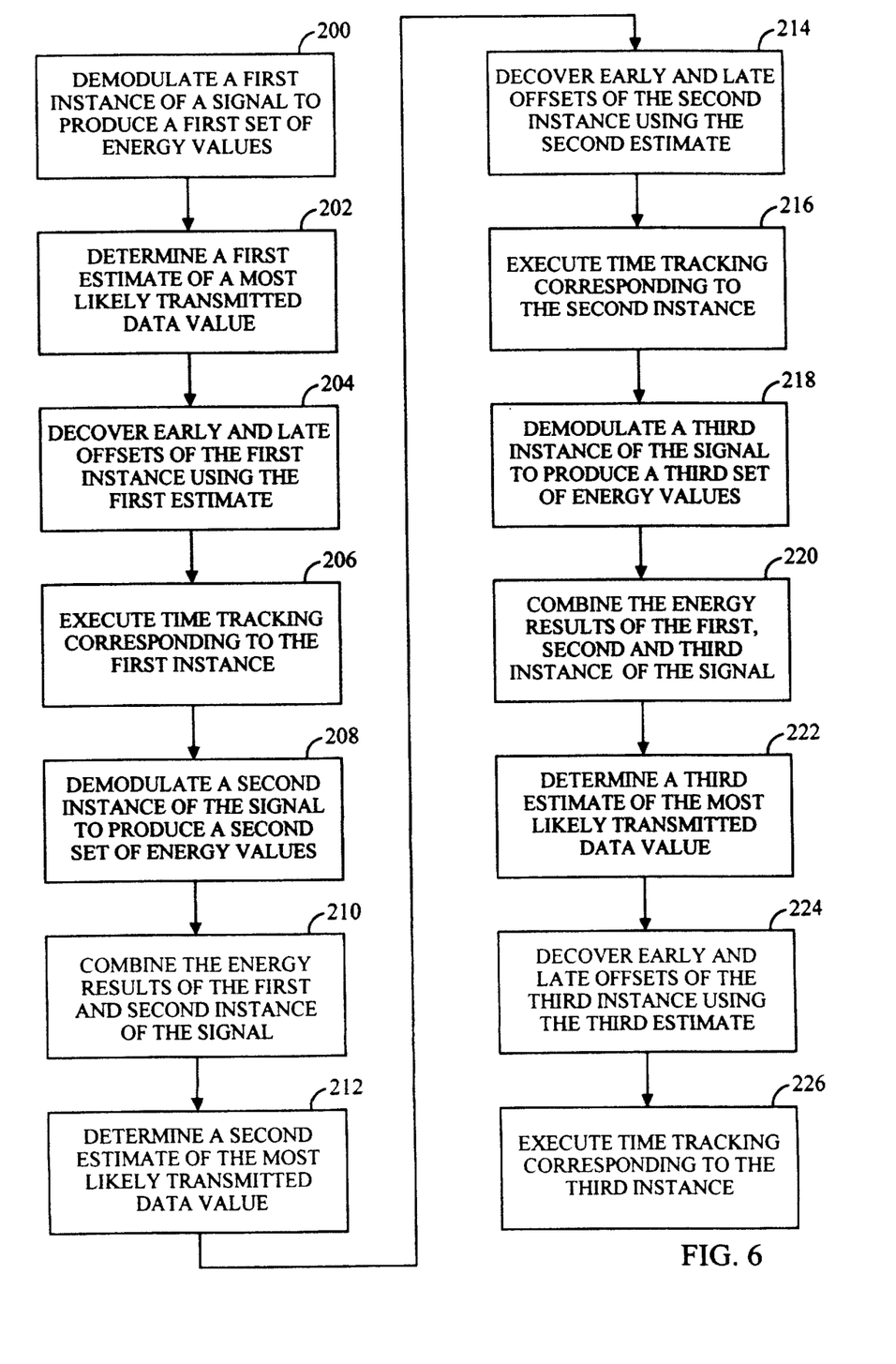
FIG. 6 is a flow chart showing operation in which the signal instances are received significantly offset in time from one another.

The process accomplished in FIG. 6 is described in a general sense with reference to the flow chart in FIG. 7. In block 270, a first instance of a signal is demodulated to produce a first set of energy values. In block 272, a second instance of a signal is demodulated to produce a second set of energy values. In block 274, a third instance of a signal is demodulated to produce a third set of energy values. These energy values are combined in block 276 and used to determine an estimate of a most likely transmitted data value in block 278.

The estimate is used to decover the early and late offset samples corresponding to the first instance in block 280. In block 282, time tracking for the first instance is executed based upon these results. The estimate is used to decover the early and late offset samples corresponding to the second instance in block 284. In block 286, time tracking for the second instance is executed based upon these results. The estimate is used to decover the early and late offset samples corresponding to the third instance in block 288. And, in block 290, time tracking for the third instance is executed based upon these results. Although FIGS. 7 and 8 show the demodulation of three or more instances of the signal, in some embodiments, just two instances of the signal can be demodulated.

Figure 8:
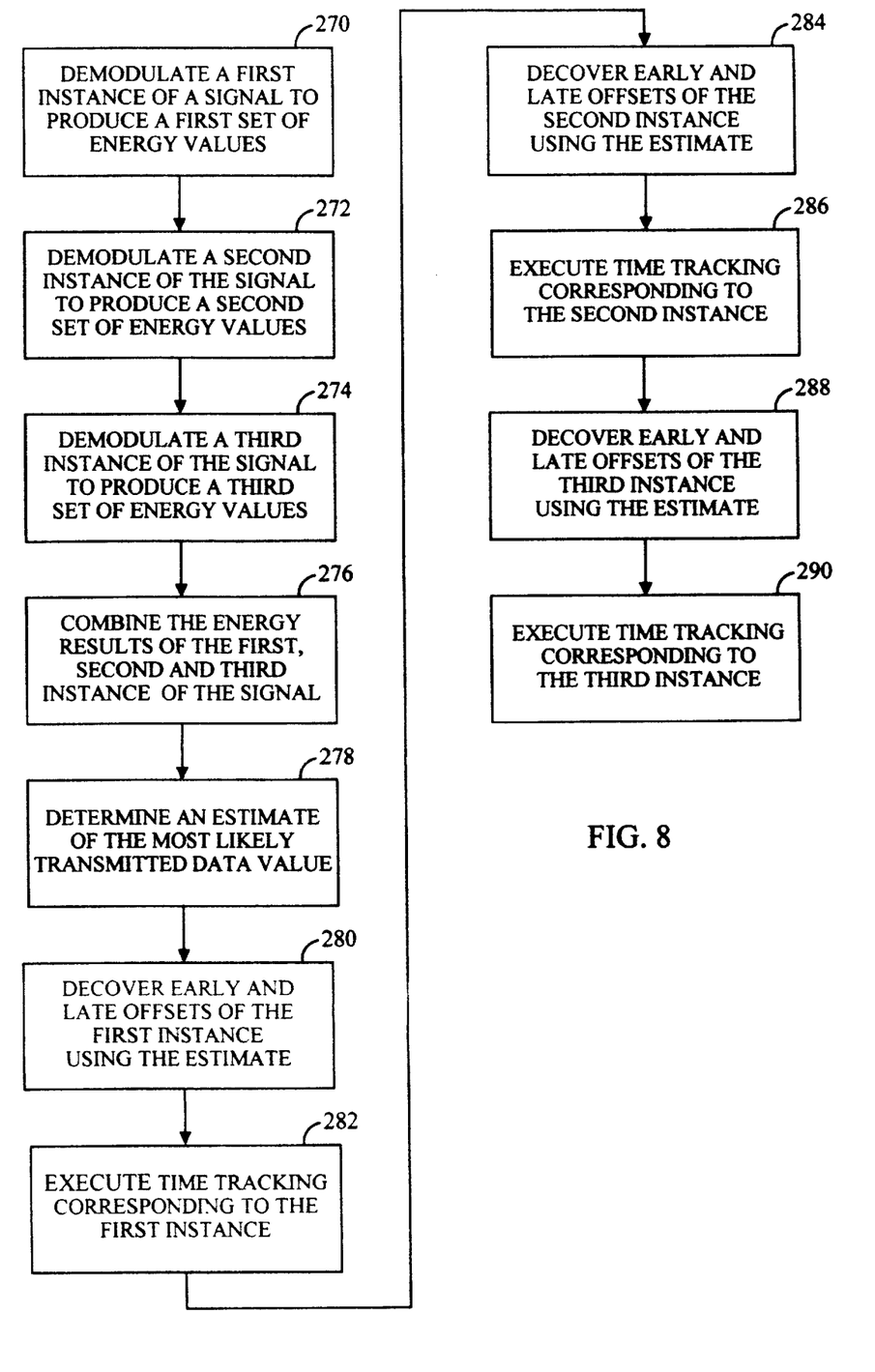
FIG. 8 is a flow chart showing operation in a system in which multiple instances of a common signal are received in relatively close temporal proximity to one another.

The embodiment shown in FIGS. 7 and 8 has performance advantages over the embodiment shown in FIGS. 5 and 6. The performance advantages are gained because the output of the maximum detector 240 is the best estimate of the most likely transmitted data value available at the receiver while the output of the maximum detector 140 of FIG. 5 is not the best estimate in some cases (such as when additional signal instances are available). In FIG. 5, only the output of the maximum detector corresponding to the demodulation element assigned to the latest arriving signal instance uses all the energy information available at the receiver.

However, the embodiment shown in FIGS. 4 and 6 can be more practical to implement if the time difference between the arrival times of the signal instances is relatively large. As the time offsets between the successive signal instances increases, the amount of data which must be buffered until the most likely transmitted data value is determined increases. At some point, the quantity of data which must be stored becomes prohibitive. In addition, such operation introduces a delay in the time tracking process which decreases the response time of the time tracking process to changes in a signal instance. The configuration in FIGS. 5 and 6 allows a more rapid determination of the time offset of the earliest arriving signal than is possible with FIGS. 7 and 8. In addition, the configuration reduces the average amount of data stored in the system for a set of given time offsets as compared to FIGS. 7 and 8.

The operation according to the invention increases the energy input into the time tracking process. The increased energy increases the accuracy and speed of the time tracking process. By increasing the performance the time tracking process, signal instances which were previously too weak to be properly time tracked can be now be time tracked accurately. In this way, additional energy is available to the system in terms of additional viable signal instances which previously could not have been accurately demodulated. The additional energy in turn improves the overall performance of the receiver.

With reference to the information above, a myriad of alternative embodiments within the scope of the invention will be readily apparent to one skilled in the art, such as the simple re-arrangement of the blocks shown in the figures. Although the demodulation elements are shown in FIGS. 5 and 7 as comprised of discrete elements, in some embodiments, these elements can be embodied in a time multiplexing architecture in which multiple instances of a signal are sequentially processed by a common set of circuit elements. One such embodiment is detailed in U.S. Pat. No. 5,654,979 referred above. Generally such embodiments are implemented in application specific integrated circuits (ASIC) although they can also be designed with discrete components or executed in software. The elements of FIGS. 5 and 7 can be steps of a method.

The embodiments above are described with reference to a system which uses Walsh symbols. The techniques described herein can be applied to system which use other means and methods of encoding and decoding the data.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of time tracking in a wireless receiver comprising the steps of:

demodulating a first instance of a signal to produce a first set of energy values corresponding to a set of possible data values of said signal;

demodulating a second instance of said signal to produce a second set of energy values corresponding to said set of possible data values;

combining said first and said second sets of energy values to determine a combined set of energy values;

determining a first estimate of a most likely transmitted data value based upon said combined set of energy values;

decovering an early set of despread samples of said first instance using a symbol corresponding to said first estimate to produce a first early energy value;

decovering a late set of despread samples of said first instance using said symbol corresponding to said first estimate to produce a first late energy value; and determining a time offset of said first instance based upon said first early and said first late energy values.

2. The method of claim 1, further comprising the steps of:

decovering an early set of despread samples of said second instance using said symbol corresponding to said first estimate to produce a second early energy value;

decovering a late set of despread samples of said second instance using said symbol corresponding to said first estimate to produce a second late energy value; and determining a time offset of said second instance based upon said second early and said second late energy values.

3. The method of claim 1, wherein said second instance arrives at said receiver before said first instance, and wherein the method further comprises the steps of:

determining a second estimate of said most likely transmitted data value based upon said second set of energy values;

decovering an early set of despread samples of said second instance using said symbol corresponding to said second estimate to produce a second early energy value;

decovering a late set of despread samples of said second instance using a symbol corresponding to said second estimate to produce a second late energy value; and determining a time offset of said second instance based upon said second early and said second late energy values.

4. The method of claim 1, further comprising the steps of:

demodulating a third instance of a signal to produce a third set of energy values corresponding to said set of possible data values;

combining said third and said combined set of energy values to determine a second combined set of energy values;

determining a second estimate of said most likely transmitted data value based upon said second combined set of energy values;

decovering an early set of despread samples of said third instance using a symbol corresponding to said second estimate to produce a third early energy value;

decovering a late set of despread samples of said third instance using said symbol corresponding to said second estimate to produce a third late energy value; and determining a time offset of said third instance based upon said third early and said third late energy values.

5. The method of claim 1, further comprising the steps of:

demodulating a third instance of a signal to produce a third set of energy values corresponding to said set of possible data values;

wherein said step of combining further comprises the step of combining said third set of energy values with said first and second sets of energy values to produce said combined set of energy values;

decovering an early set of despread samples of said third instance using said symbol corresponding to said first estimate to produce a third early energy value;

decovering a late set of despread samples of said third instance using said symbol corresponding to said first estimate to produce a third late energy value; and determining a time offset of said third instance based upon said third early and said third late energy values.

6. An apparatus for time tracking in a wireless receiver comprising:

means for demodulating a first instance of a signal to produce a first set of energy values corresponding to a set of possible data values of said signal;

means for demodulating a second instance of said signal to produce a second set of energy values corresponding to said set of possible data values;

means for combining said first and said second sets of energy values to determine a combined set of energy values;

means for determining a first estimate of a most likely transmitted data value based upon said combined set of energy values;

means for decovering an early set of despread samples of said first instance using a symbol corresponding to said first estimate to produce a first early energy value;

means for decovering a late set of despread samples of said first instance using said symbol corresponding to said first estimate to produce a first late energy value; and means for time tracking said first instance using said first early and said first late energy values.

7. The apparatus of claim 6, further comprising:

means for decovering an early set of despread samples of said second instance using said symbol corresponding to said first estimate to produce a second early energy value;

means for decovering a late set of despread samples of said second instance using said symbol corresponding to said first estimate to produce a second late energy value; and means for time tracking said second instance using said second early and said second late energy values.

8. The apparatus of claim 6, wherein said second instance arrives before said first instance, and wherein the apparatus further comprises:

means for determining a second estimate of said most likely transmitted data value based upon said second set of energy values;

means for decovering an early set of despread samples of said second instance using a symbol corresponding to said second estimate to produce a second early energy value;

means for decovering a late set of despread samples of said second instance using said symbol corresponding to said second estimate to produce a second late energy value; and means for time tracking said second instance using said second early and said second late energy values.

9. The apparatus of claim 6, further comprising:

means for demodulating a third instance of a signal to produce a third set of energy values corresponding to said set of possible data values;

means for combining said third and said combined set of energy values to determine a second combined set of energy values;

means for determining a second estimate of said most likely transmitted data value based upon said second combined set of energy values;

means for decovering an early set of despread samples of said third instance using a symbol corresponding to said second estimate to produce a third early energy value;

means for decovering a late set of despread samples of said third instance using said symbol corresponding to said second estimate to produce a third late energy value; and means for time tracking said third instance using said third early and said third late energy values.

10. The apparatus of claim 6, further comprising:

means for demodulating a third instance of a signal to produce a third set of energy values corresponding to said set of possible data values;

wherein said means for combining further comprises means for combining said third set of energy values with said first and second sets of energy values to produce said combined set of energy values;

means for decovering an early set of despread samples of said third instance using said symbol corresponding to said first estimate to produce a third early energy value;

means for decovering a late set of despread samples of said third instance using said symbol corresponding to said first estimate to produce a third late energy value; and means for time tracking said third instance using said third early and said third late energy values.

11. A rake receiver comprising:

a first demodulation element configured to receive a series of signal samples and configured to be assigned to a first instance of a signal, so as to produce a first set of energy values corresponding to a set of possible data values of said signal;

a second demodulation element configured to receive said series of signal samples and configured to be assigned to a second instance of said signal, so as to produce a second set of energy values corresponding to said set of possible data values of said signal;

a combiner configured to combine said first and second sets of energy values so as to produce a combined set of energy values;

a maximum detector configured to determine a first estimate of a most likely transmitted data value based upon said combined set of energy values;

a first early symbol decoveror configured to receive a first early set of despread samples of said first instance, and to decover said first early set of despread samples using a symbol corresponding to said first estimate so as to produce a first early energy value;

a first late symbol decoveror configured to receive a first late set of despread samples of said first instance, and to decover said first late set of despread samples using a symbol corresponding to said first estimate so as to produce a first late energy value; and a first time trackor configured to receive said first early and said first late energy values so as to produce an updated estimate of a time offset at which said first instance is received.

12. The rake receiver of claim 11, further comprising:

a second early symbol decoveror configured to receive a second early set of despread samples of said second instance, and to decover said second early set of despread samples using said symbol corresponding to said first estimate so as to produce a second early energy value;

a second late symbol decoveror configured to receive a second late set of despread samples of said second instance, and to decover said second late set of despread samples using said symbol corresponding to said first estimate so as to produce a second late energy value; and a second time trackor configured to receive said second early and said second late energy values so as to produce an updated estimate of a time offset at which said second instance is received.

13. The rake receiver of claim 11, wherein said second instance is an earlier arriving signal than said first instance further comprising:

a maximum detector configured to determine a second estimate of said most likely transmitted data value based upon said second set of energy values;

a second early symbol decoveror configured to receive a second early set of despread samples of said second instance, and to decover said second early set of despread samples using a symbol corresponding to said second estimate so as to produce a second early energy value;

a second late symbol decoveror configured to receive a second late set of despread samples of said second instance, and to decover said second late set of despread samples using said symbol corresponding to said second estimate so as to produce a second late energy value; and a second time trackor configured to receive said second early and said second late energy values so as to produce an updated estimate of a time offset at which said second instance is received.

14. The rake receiver of claim 11, further comprising:

a third demodulation element configured to receive said series of signal samples and configured to be assigned to a third instance of said signal, so as to produce a third set of energy values corresponding to said set of possible data values of said signal;

wherein said combiner is further configured to combine said third set of energy values with said first and second sets of energy values to produce said combined set of energy values;

a third early symbol decoveror configured to receive a third early set of despread samples of said third instance, and to decover said third early set of despread samples using said symbol corresponding to said first estimate so as to produce a third early energy value;

a third late symbol decoveror configured to receive a third late set of despread samples of said third instance, and to decover said third late set of despread samples using said symbol corresponding to said first estimate so as to produce a third late energy value; and a third time trackor configured to receive said third early and said third late energy values so as to produce an updated estimate of a time offset at which said third instance is received.

15. The rake receiver of claim 11, further comprising:

a third demodulation element configured to receive said series of signal samples and configured to be assigned to a third instance of said signal, so as to produce a third set of energy values corresponding to said set of possible data values of said signal;

a second combiner configured to combine said third set of energy values with said combined set of energy values to produce a second combined set of energy values;

a second maximum detector configured to determine a second estimate of said most likely transmitted data value based upon said second combined set of energy values;

a third early symbol decoveror configured to receive a third early set of despread samples of said third instance, and to decover said third early set of despread samples using a symbol corresponding to said second estimate so as to produce a third early energy value;

a third late symbol decoveror configured to receive a third late set of despread samples of said third instance, and to decover said third late set of despread samples using said symbol corresponding to said second estimate so as to produce a third late energy value; and a third time trackor configured to receive said third early and said late early energy values so as to produce an updated estimate of a time offset at which said third instance is received.

* * * * *